US006048431A

United States Patent [19]

Clements et al.

[11] Patent Number: 6,048,431

[45] **Date of Patent: *Apr. 11, 2000**

[54] METHOD OF PREPARING AN ARTICLE USING CLEANLY REMOVABLE VENEER TAPE

[75] Inventors: George J. Clements, Afton; Robert E. Bolitsky, Woodbury; Sheila F. Cox, Maplewood; John D. Lunzer, Little Canada, all of Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,890

[22] Filed: Jun. 3, 1997

[51] Int. Cl.[7] .......... B32B 31/10

[52] U.S. Cl. .......... 156/247; 156/230

[58] Field of Search .......... 156/247, 297, 156/299, 230, 338; 52/384, 385, 388

[56] References Cited

U.S. PATENT DOCUMENTS

| | | | |
|---|---|---|---|
| 2,607,711 | 8/1952 | Hendricks . | |
| 2,647,843 | 8/1953 | Bemmels . | |
| 2,881,096 | 4/1959 | Kisbany . | |
| 2,987,420 | 6/1961 | Bemmels et al. . | |
| 3,890,185 | 6/1975 | Umazume | 156/299 |
| 3,899,860 | 8/1975 | Newell . | |
| 4,406,099 | 9/1983 | Barrett | 52/388 X |
| 4,599,265 | 7/1986 | Esmay . | |
| 4,737,559 | 4/1988 | Kellen et al. . | |
| 4,802,946 | 2/1989 | Mason | 156/297 X |
| 4,853,062 | 8/1989 | Gartland | 156/297 X |
| 5,190,087 | 3/1993 | Mike . | |
| 5,194,310 | 3/1993 | Lenderink . | |
| 5,240,989 | 8/1993 | Bernard et al. . | |
| 5,407,726 | 4/1995 | Serra et al. . | |
| 5,445,696 | 8/1995 | Krawczyk | 156/247 X |
| 5,506,279 | 4/1996 | Babu et al. . | |
| 5,604,019 | 2/1997 | Bland et al. . | |
| 5,604,035 | 2/1997 | Kojima et al. . | |
| 5,609,954 | 3/1997 | Aizawa et al. . | |
| 5,728,246 | 3/1998 | Ewaschuk . | |

FOREIGN PATENT DOCUMENTS

| | | |
|---|---|---|
| 591055 A2 | 4/1994 | European Pat. Off. . |
| 41 35 659 A1 | 5/1993 | Germany . |
| 58-152084 | 9/1983 | Japan . |
| 60/127385 | 7/1985 | Japan . |
| 61/78887 | 4/1986 | Japan . |
| 62/164782 | 7/1987 | Japan . |
| 02307701 | 12/1990 | Japan . |
| 4/8782 | 1/1992 | Japan . |
| 7/62304 | 3/1995 | Japan . |

OTHER PUBLICATIONS

Irving Skeist, PhD, "Handbook of Adhesives, Third Edition," pp. 641–649, 1990.

The Complete Manual of Wood Veneering, by W. A. Lincoln, published by Linden Publishing Inc., Fresno, CA, 1984, pp. 166–171 and 278–283.

A Manual of Veneering, by Paul Villiard, published by Dover Publications, Inc. New York, 1975, pp. 80–89.

*Primary Examiner*—Curtis Mayes
*Attorney, Agent, or Firm*—James J. Trussell

[57] ABSTRACT

A method for maintaining a plurality of wood veneer substrates in fixed relation to each other that includes positioning a plurality of wood veneer substrates in relation to each other, and applying a tape to the substrates to maintain the substrates in fixed relation to each other. The tape is capable of maintaining wood veneer substrates in fixed relation to each other before and during a lamination process in which the substrates are laminated to an underlying base, and is cleanly removable from the substrates following the lamination process.

14 Claims, No Drawings

METHOD OF PREPARING AN ARTICLE USING CLEANLY REMOVABLE VENEER TAPE

TECHNICAL FIELD

The present invention relates to veneer tape. More particularly, the present invention relates to veneer tape that is easily removable from wood.

BACKGROUND OF THE INVENTION

Veneer tape is used in the furniture industry as a process aid in the assembly of composite wood panels having veneered surfaces. Complex versions of these composite wood panels are known as "fancy face" veneered surface panels. The current practice in the furniture industry is to assemble furniture with thin wooden veneers covering a dimensionally stable, but cheaper core board, such as particle board. The decorative wood species desired by consumers, such as oak, maple, cherry, and others, are expensive and thus are most commonly used in the form of thin veneers about 0.8 mm (0.03 in) thick. These veneer pieces are often arranged in a side-by-side relationship and fastened together to form a composite panel or veneer surface.

One method used to fasten the veneers employs a non-pressure sensitive adhesive tape having a water-activated gum adhesive on a kraft paper backing. A worker pulls the gum side of the tape across a wetted sponge where it picks up enough moisture to become tacky. The worker then applies the tape to one of the veneers to be joined, and uses the free end of the tape to pull that piece into edge contact with a second piece. The tape is then rubbed down onto the second piece, and the process is repeated until the full surface is completed. As the gum of the tape loses water it becomes non-tacky, and forms a secure, permanent bond with the wood and the other layers of tape.

Many small pieces of tape may be required to hold the pieces of surface veneer in place on a normally sized piece of furniture. Consequently there may be spots where multiple layers of tape exist. Five to seven tape layers are common for some fancy faces. This is particularly the case where the joined veneers are small, the design is intricate, and mitered corners are made.

After the pattern is assembled it is joined to the core board. The core board is run through a roll coater that applies glue to the surface of the board. The taped veneer assembly is positioned on the glued board and then pressed to the board. If a cold press is used, the glue is commonly a water-based vinyl glue. For a hot press, the glue is urea based. Cold press conditions are typically 4.2 $kg/cm^2$ (60 psi) for 45 minutes. Hot press conditions vary by manufacturer, but may reach temperatures of up to 149° C. (300° F.) or higher and pressures of up to 8.8 $Kg/cm^2$ (125 psi) for 1–7 minutes.

After coming out of the press the parts are sanded to remove the tape. Because the tape has formed a permanent bond to the wood, it must be sanded off of the veneer surface. Aggressive cross-grain sanding removes most of the tape. After cross-grain sanding, the parts typically go through three more sanding steps to prepare the surface for staining and varnishing.

A strongly negative aspect of cross-grain sanding is that the veneer is also aggressively sanded, and frequently has deep scratches that can be removed only by further sanding. Also, frequently the veneer is sanded through, exposing the core board underneath. A sanded-through part cannot be repaired, and is thrown away.

Because the kraft paper backed tape is opaque, when a joint is misaligned, it may not be discovered until the tape is sanded off. Also, if a seam opens up before the pressing operation, creating a gap between two pieces of veneer, it may not be detected before the glue has set.

Waste also occurs when the tape or glue is not totally removed during sanding, resulting in differences and non-uniformities in stain absorption and appearance. Additional losses occur when veneers are sanded too thinly so as not to accept stain adequately. Also if the laminating glue is too near the surface of the veneer, stain will not take to the surface as readily and uniformly as it takes to surfaces in which the veneer is thicker.

Waste associated with the process in which veneers are taped together with a water-activated paper tape are estimated at up to 50% depending upon the intricacy of the veneer pattern. Veneers are currently valued at up to 30 dollars per square foot depending upon the type of wood and the grain pattern. Wasting up to half of this product amounts to significant losses.

There is also an economically driven trend toward thinner veneers, such as 0.5 mm (0.02 in) or less. As veneers become thinner, however, the margin for sanding becomes tighter, and furniture makers can less afford to sand down those veneer skins. A non-damaging removal of veneer tape would greatly reduce the scrap rate, and allow furniture makers to use thinner, and less expensive, wood veneers.

SUMMARY OF THE INVENTION

In one aspect, the invention features a method for maintaining a plurality of porous substrates in fixed relation to each other. The method includes positioning a plurality of porous substrates in relation to each other, and applying a tape to the substrates to maintain the substrates in fixed relation to each other. The tape includes a backing, and a pressure sensitive adhesive composition disposed on the backing. The tape is capable of maintaining the substrates in fixed relation to each other before and during a lamination process in which the substrates are laminated to an underlying base. The tape is cleanly removable from the substrates following the lamination process.

In preferred embodiments, the porous substrate is a wood veneer substrate. The method can include cleanly removing the tape from the substrates. The tape is preferably cleanly removable by peeling the tape from the substrates or heating the tape to shrink the backing. The method can further include placing the substrates on an underlying base, and laminating the substrates to the base.

In another aspect, the invention features a tape that includes a polymeric backing, and a pressure sensitive adhesive composition disposed on the backing. The tape is capable of maintaining a plurality of wood veneer substrates in fixed relation to each other before and during a lamination process in which the substrates are laminated to an underlying base, and is cleanly removable from the substrates following the lamination process. Preferred backings are paper or polymeric. In preferred embodiments, the backing is transparent.

In one embodiment, the backing is tear resistant. The backing can include a plurality of layers, e.g., at least six layers. A portion of the backing can be essentially free of adhesive composition. The tape can also include a primer composition disposed between the backing and the adhesive composition.

In another embodiment, the backing is heat shrinkable. The tape preferably exhibits a shrink strength that is greater than its peel adhesion strength to the wood veneer substrates. The backing can be an oriented film that includes a polymer selected from the group consisting of polyethylene polymers, polypropylene polymers, polyester polymers, polyvinyl chloride polymers, and combinations of these materials and combinations of these materials with other materials. The backing can be a biaxially oriented polypropylene film.

The adhesive composition can have a viscosity such that the adhesive composition does not substantially flow into the pores of the wood veneer substrates. Adhesive compositions can have a gel content of at least about 50%, preferably at least about 80%.

In one embodiment, the adhesive composition is a rubber based adhesive. In another embodiment, the adhesive composition includes the reaction product of an acrylic acid ester and a polar ethylenically unsaturated monomer, e.g., the reaction product of isooctyl acrylate and n-octyl acrylamide, or isooctyl acrylate and acrylic acid.

DETAILED DESCRIPTION

In general, the tapes feature a backing (e.g., paper or polymeric backings), and a pressure sensitive adhesive composition disposed on the backing. Individual components of the tape will be described below.

The tapes feature clean removability after exposure to high temperature and/or high pressure such that the tapes can be removed from a substrate by hand and with little to no adhesive residue remaining on the substrate. The tape can also be removable without slivering.

The tape constructions that include transparent backings and transparent adhesive compositions allow a user to see through the tape to the wood, which facilitates alignment of the surface veneer pieces. In addition, transparent tape constructions allow the veneer joints to be checked during production, before laminating and pressing. This further allows defective parts to be identified and removed from the process before additional value is added to the part.

In addition, laser light alignment of the pieces can occur while a transparent tape is on the surface veneer.

The veneer tape can be made thinner than known paper tapes. By using a thinner tape, there is less imprinting in the wood during the press process, and this too will lead to fewer rejects caused by sanding. Because imprints in the wood must be removed before finishes are applied, reducing the imprint will also benefit production.

Other advantages and features of the invention will be apparent from the detailed description and from the claims.

Backings

In one embodiment, the tape features a tear resistant backing. "Tear resistant" broadly means that a backing demonstrates a Graves area in one direction of the backing that exceeds the Graves area in the same direction for a single layer backing comprising only the stiff polyester/copolyester of the multilayer backing, the single layer backing being processed in the same manner as and to substantially the same thickness as the multilayer backing. Preferably, the backing demonstrates a Graves area in one direction of the backing equal to at least about 40+0.4(x) kpsi % wherein x is the nominal thickness of the film in microns. More specifically, Graves area is obtained by mathematically integrating the area beneath the curve in a graphical plot of the stress (as measured in kpsi) experienced by the backing versus the strain (as measured in Grave elongation, which is defined more fully below) that the backing undergoes during a test in which a backing sample specifically shaped for the Graves area test is clamped between opposed jaws that are moved apart at a constant rate to concentrate the tearing stresses in a small area. Thus, Graves area is a combined measure of the backing's tensile modulus (the backing's stiffness and dimensional stability) and the ability of the film to resist advancing a tear. Consequently, Graves area may be regarded as a measure of the total energy required to cause the backing to fail; that is, the ability of the backing to absorb energy.

Suitable tear resistant backings exhibit a Graves elongation at break of at least 20%, preferably at least 40% during the Graves area test. In addition, suitable multilayer tear resistant backings demonstrate a tensile modulus (as measured in a conventional tensile test) of at least 1,208 MPa (175 kpsi), at least 1,656 MPa (240 kpsi), and at least 3,105 MPa (450 kpsi) in at least one direction of the backing.

The tear resistant backings are sufficiently thin to minimize the indent into the wood veneer substrate made by the backing during the lamination process, yet thick enough to allow handling and use in lamination processes, e.g., the lamination processes used in furniture manufacturing. Useful tear resistant backings also maintain dimensional stability and structural integrity during the lamination process. Particularly useful tear resistant backings are flexible, transparent, and do not sliver upon removal from the wood substrate.

Suitable tear resistant backings have multiple layers compressed together to form a single backing. Particularly useful tear resistant backings include at least about two layers, and may include about six to thirteen layers, or more, depending upon the application. Suitable tear resistant backing materials include polyester (e.g., stiff polyesters and copolyesters), nylon, high strength cloth, and filament composite. Examples of suitable tear resistant backing materials, backings, and their methods of manufacture are disclosed in U.S. Pat. No. 5,604,019, and European Patent Application No. 591,055A2, both of which are incorporated herein by reference. Suitable tear resistant backings have a thickness of between about 30 and 130 $\mu$m (0.00014 and 0.00020 in), and between about 35 and 40 $\mu$m (0.00014 and 0.00016 in).

In another embodiment, the tape features a heat shrinkable backing. Heat causes the backing to shrink, which causes the tape to pull off of the wood veneer substrate leaving little to no adhesive residue on the wood veneer substrate.

Useful heat shrinkable backings have a shrink strength (i.e., the force exerted on the adhesive composition by the backing when the backing is exposed to sufficient temperature to cause it to shrink) sufficient to pull the adhesive composition from a wood veneer substrate upon shrinking. particularly useful heat shrinkable backings have a shrink strength greater than the adhesion strength between the adhesive composition and the wood veneer substrate such that the backing will pull the adhesive composition away from the wood veneer substrate upon shrinking. Temperatures sufficient to cause the backing to shrink may be less than temperatures experienced by the backing during the laminating process, because the applied pressure maintains the backing in place, which prevents the backing from shrinking.

The thickness of the heat shrinkable backing affects the shrink strength. Particularly useful heat shrinkable backings are constructed to minimize the backing's depth of indentation into the wood veneer substrate (i.e., imprint), yet maximize the backing's shrink strength. Backings that are too thin will be difficult to handle and to employ in a manufacturing process. Particularly useful heat shrinkable backings have a thickness of from about 12.7 to 88.9 μm (0.00050 to 00035 in), more suitably between about 19.0 to 76.2 μm (0.00075 to 0.0030 in), most suitably between about 25.4 to 50.8 μm (0.0010 in to 0.0020 in).

Examples of useful heat shrinkable backing materials include uniaxially or biaxially oriented films that include polyester polymers, polyvinyl chloride polymers, polyethylene polymers, polypropylene polymers, or propylene-ethylene copolymers, or combinations thereof, and single and multi-layer films commonly used in the shrink wrap industry. Biaxially oriented polypropylene backings are particularly advantageous because of their relatively low cost, transparency, ecological impact (polypropylene is readily incinerated and can be recycled), thin caliper, and good heat shrinkability.

Examples of commercially available heat shrinkable backings include 30 μm(1.2 mil) thick biaxially oriented polypropylene films (available from the AEP, North Andover, Mass.), and (Mobile Chemical Co., Pittsford, N.Y.).

The backings can be modified before contact with the adhesive composition to promote adhesion between the adhesive composition and the backing. The backing may be modified by coating a primer composition onto the surface of the backing. The backing can also be primed by exposing the backing to a corona treatment or a flame treatment in the absence of a primer. Particularly useful treatments include exposing the backing to a corona treatment followed by application of a heat activatable phenolic primer.

Primer compositions suitable for use in conjunction with rubber-based adhesive compositions include styrene butadiene rubber, natural rubber, or neoprene rubber or combinations thereof and a heat activated phenolic resin. One example of a particularly useful primer composition includes about 40 to 60 parts natural rubber, 15 to 30 parts neoprene rubber, and 10 to 45 parts phenolic resin, diluted to a 20 to 35% solids solution in toluene or xylene. Other suitable primer compositions are described, for example, in U.S. Pat. No. 2,647,843 (Bemmels) incorporated herein by reference. Primer compositions can be usefully coated at a weight of 1 to 5 $g/m^2$ (0.25 to 1.25 grains/24 $in^2$).

The backings can also include a low adhesion backsize material to aid in tape unwind when the tape is in the form of a roll. The backsize material is coated on a surface opposite the surface coated with the adhesive composition. Useful backsize materials have softening points above about 107° C., in particular above 125° C. Suitable backsize materials include well known backsize materials such as, e.g., urethanes (for use in cold processes), acrylics, and fluorochemicals. One example of a commercially available backsize is ESCOAT (available from Anderson Development Co., Adriene, Mich.). Examples of suitable backsize compositions are disclosed in U.S. Pat. No. 2,607,711 (Hendricks), incorporated herein by reference.

Adhesive Compositions

A pressure sensitive adhesive composition is disposed on the backing. Suitable adhesive compositions are formulated such that the tape adheres to the wood veneer substrates before and during a lamination process of the type used to manufacture furniture in which the substrates are adhered to an underlying base such as particle board and then subjected to heat and pressure to form a unitary article. The compositions are further designed such that the tape is cleanly removable from the substrates following lamination, and, in the case of tape constructions having heat shrinkable backings, the tape is cleanly removable upon heating. For example, following a lamination process, tape constructions can be peeled off a porous wood substrate leaving minimal adhesive residue on the porous wood substrate, such that less than 10% of the adhesive remains on the substrates following lamination. In addition, to the extent any adhesive remains, the adhesive is designed such that it can be brushed away by hand, or removed with moderate sanding without noticeable loading of sanding belts and pads. The tape constructions are cleanly removable such that no sanding is required to remove the backing from the porous wood substrate.

To achieve these objectives, the adhesive composition is formulated to be sufficiently viscous such that the composition does not substantially flow into the pores of the wood veneer substrate either before or during lamination, and to exhibit little or no cohesive failure and little to no adhesive failure at the backing-adhesive interface following exposure to temperature and pressures of the type encountered during furniture manufacture. The adhesive is formulated to exhibit moderate tack as measured by its peel adhesion. In particular for a rubber-band adhesive, before lamination the adhesive exhibits a peel adhesion strength of at least about 1.64 N/cm (15 oz/in) measured on a steel substrate at room temperature pursuant to ASTM D3330, Test Method A.

The pressure sensitive adhesive compositions can be solvent based, water based, or 100% solids.

Crosslinkable pressure sensitive adhesives are desirable. In particular for a rubber-band adhesive, the level of crosslinking is adjusted such that the composition has a gel content of between about 50 and 100% (preferably at least about 80%), as measured according to the test procedure described in the Examples section, below.

Suitable adhesive compositions include well-known adhesives such as rubber based adhesives and acrylic adhesives. These adhesive compositions may be modified by manipulating the level of tack and the degree of crosslinking to yield an adhesive composition exhibiting the requisite properties.

Accelerators may be added to the adhesive composition to accelerate crosslinking. Examples of suitable accelerators include zinc salts (e.g., zinc rosinate), tin chloride, and acid accelerators (e.g., stearic acid). The amount of accelerator typically ranges from about 5 to 15 parts by weight per 100 parts polymer.

Suitable tackifying resins include rosin esters, terpenes, phenols, and aliphatic, aromatic, or mixtures of aliphatic and aromatic synthetic hydrocarbon pure monomer resins. Examples of useful tackifying resins that are commercially available include Foral™ 85 and hydrocarbon resins sold under the Regalrez™ tradename by Hercules, Inc., ECR-1801™ available from Exxon Chemicals, and SP553™ terpene phenolic resin available from Schenectady International, Inc. The amount of tackifying resin typically ranges from about 20 parts to about 70 parts by weight per 100 parts polymer.

The adhesive composition can also include fillers such as zinc oxide, titanium dioxide, magnesium oxide, and calcium carbonate. The amount of filler typically ranges from about 0 parts up to 20 parts by weight per 100 parts polymer.

Antioxidants may be added to increase the shelf life of the adhesive composition. Examples of suitable antioxidants include polymeric hindered phenolics (available under the trade designation "Wingstay L" from Goodyear), 3,3-dilauryl thiodipropionate (available under the trade designation "Cyanox LTDP" from Cytec Industries, Boundbrook, N.J.), amine antioxidants, e.g., N-N'-di-β-naphthyl 1,4-phenylenediamine (available from AgeRiteD), and phenolic type antioxidants, e.g., 2,5,-di-(tert amyl)hydroquinone (Santon A™), 2-2'-methylene bis (4-methyl-6-tert butyl phenol) (Antioxidant 2246). The amount of antioxidant typically ranges from about 0 parts up to 5 parts by weight per 100 parts polymer.

Additional components may be added to increase the holding power of the adhesive composition. One example of a class of such components is aryl disulfides (commercially available under the trade designation "Vultac" from Atochem North America, Riverview, Mich.)

Useful rubber based adhesive compositions include 100 parts elastomeric component, about 5 to 20 parts phenolic resin crosslinking agent, about 5 to 15 parts accelerator, and about 25 to 70 parts tackifying resin.

Suitable elastomeric components include, e.g., styrene butadiene rubber, natural rubber and combinations thereof.

Suitable phenolic resins include alkyl phenolic resins, aryl phenolic resins, and halogenated phenolic resins, e.g., brominated phenolic resin. Examples of suitable phenolic resins and their methods of manufacture are described in U.S. Pat. No. 2,987,420 (Bemmels), incorporated herein by reference.

An example of such a rubber based adhesive composition is a phenolically crosslinkable natural rubber adhesive composition that includes phenolic resin, zinc rosinate, a tackifying resin, zinc oxide and an antioxidant, and is sufficiently crosslinked as to have a gel content of at least about 50% as measured according to the test procedure described in the Examples section below.

The adhesive compositions can be prepared by a variety of methods including, solution polymerization, emulsion polymerization, and bulk polymerization, e.g., photoinitiated bulk polymerization. One example of a suitable method of preparation is described in U.S. Pat. No. 2,881,096.

Another class of pressure sensitive adhesive compositions that have been found to be suitable in the case of heat shrinkable backings exhibits a gel content of between about 50% to 90%, as measured according to the test procedure described below, and a 180° peel adhesion strength (before being subjected to a wood veneer lamination process) of at least about 0.39 N/cm (1.0 3.6 oz/in) measured on an oak substrate at room temperature according to the peel adhesion test procedure in the Examples section, below. The adhesive composition also exhibits an adhesive bond to the heat shrinkable backing that is greater than its peel adhesion strength to the wood veneer substrate, such that little or no adhesive failure occurs at the backing-adhesive interface.

Examples of suitable pressure sensitive adhesive compositions include the reaction product of 75 to 100 parts by weight of an acrylic acid ester and up to 25 parts by weight of a polar ethylenically unsaturated monomer.

Preferred adhesive compositions for use in cold press lamination processes include the reaction product of 75 to 100 parts by weight acrylic acid ester and up to 25 parts by weight polar monomer. Preferred adhesive compositions for use in lamination processes involving high heat and pressures include the reaction product of 75 to 90 parts by weight acrylic acid ester and 10 to 25 parts by weight acrylamide monomer.

The acrylic acid ester is a monofunctional acrylic ester of a monohydric alcohol having from about 4 to about 18 carbon atoms in the alcohol moiety whose homopolymer has a $T_g$ less than 0° C. Included in this class of acrylic acid esters are isooctyl acrylate, 2-ethylhexyl acrylate, isononyl acrylate, isodecyl acrylate, decyl acrylate, lauryl acrylate, hexyl acrylate, butyl acrylate, and octadecyl acrylate, or combinations thereof.

The polar ethylenically unsaturated monomer is a monomer whose homopolymer has a solubility parameter as measured by the Fedors method of greater than 10.50 and a $T_g$ greater than 15° C. to improve structural properties of the adhesive composition(e.g., cohesive strength). Examples of suitable polar monomers include acrylic acid, itaconic acid, acrylamide, mono-substituted and di-substituted acrylamides such as n-octyl acrylamide, N,N-dimethyl acrylamide, N-vinyl-2-pyrrolidone, N-vinyl caprolactam, and combinations thereof.

The monomer mixture may be polymerized by various techniques, with photoinitiated bulk polymerization being preferred. The adhesive composition may also be thermally polymerized. An initiator is preferably added to aid in polymerization of the monomers. The type of initiator used depends on the polymerization process. Photoinitiators that are useful for polymerizing the acrylate monomers include benzoin ethers such as 2-methyl-2-hydroxylpropiophenone, aromatic sulfonyl chlorides such as 2-naphthalenesulfonyl chloride, and photoactive oxides such as 1-phenyl-1, 1-propanedione-2-(o-ethoxycarbonyl)oxime. Examples of commercially available photoinitiators include Irgacure 651 (available from Ciba-Geigy, Chicago, Ill.), Darocure 1173 (Ciba-Geigy), and Lucerin TPO (available from BASF). Photoinitiators are typically added in amounts ranging from about 0.01 to about 5.0% by weight. Examples of suitable thermal initiators include azo-bis(isobutyronitrile) and peroxides.

Copolymerizable photoinitiators can also be added to the adhesive composition. Suitable copolymerizable photoinitiators are activated at higher intensity light and at wavelengths slightly greater than the activation light intensity and wavelength of the conventional photoinitiator. Examples of useful copolymerizable photoinitiators include acrylated benzophenone derivatives. One example of a useful copolymerizable photoinitiators that is commercially available is "P36" (from RadCure). Other suitable copolymerizable photoinitiators are described in U.S. Pat. No. 4,737,559 (Kellen et al.) and U.S. Pat. No. 5,506,279 (Babu et al.). The amount of copolymerizable photoinitiator typically ranges from at least about 0.15 to about 5.0% by weight.

Other additives that can be blended into the adhesive composition to alter the characteristics of the composition include, e.g., fillers, pigments, flame retardants, thickening agents, antioxidants, sequestering agents, and biocides.

In the case of heat shrinkable backings, it is preferred that the adhesive composition be essentially free of microspheres, e.g., expandable microspheres, foaming agents, surfactants, plasticizers, and softeners.

Tape Preparation

The tape may be prepared by coating an adhesive composition onto the surface of a backing using methods known to the skilled artisan including solvent coating methods, e.g., brush coating, spray coating, knife coating, bar coating, dip coating, and roll coating, 100% solids coating methods, and transfer coating methods. The adhesive coating may be continuous or discontinuous, e.g., a dot or stripe pattern.

The adhesive may be pre-formed and then coated onto the backing. Alternatively, a pre-adhesive composition (e.g., in the form of a monomeric or pre-polymeric composition) may be coated onto the backing and then irradiated, e.g., with ultraviolet radiation, to form the adhesive composition directly on the backing. The adhesive compositions may be cured under a variety of conditions. In the case of tear resistant backings, suitable cure conditions include, e.g., exposing the adhesive composition to temperatures in the range of 190 to 204° C. (375 to 400° F.) for a period of 20 to 40 seconds; and, alternatively, exposing the adhesive composition to temperatures ranging from 65 to 76 (150 to 170° F.) for period of 24 to 48 hours.

The thickness of the adhesive coating may vary depending on the application, i.e., the backing and the wood veneer substrate. The adhesive coating thickness for tear resistant backing tape constructions is generally about 75 μm (3 mils) to about 150 μm (6 mils), more generally 100 μm (4 mils). For heat shrinkable backing tape constructions the adhesive composition is coated to a thickness of between about 19.0 μm (0.00075 in) and about 76.2 μm (0.003 in), more suitably between about 38.1 μm (0.0015 in) and about 50.8 μm (0.002 in).

Useful tear resistant tape constructions include an adhesive coating weight of about 25 to 41 $g/m^2$ (6 to 10 grains/24 $in^2$)

The tape may be constructed to include a tab along a longitudinal edge of the backing. The presence of a tab makes it easier to lift an edge of the tape during the tape removal process. The tab can be created in a variety of ways including, for example, by not coating adhesive composition on the finger lift portion, deadening the adhesive composition in the area of the finger lift portion, using a thicker film to act as a tab along the tape edge, folding a portion of the tape on itself to cover the adhesive composition, or adhering additional backing to a portion of the exposed adhesive composition.

Use

The tape can be applied to a first wood veneer substrate, and the free end of the tape can be used to pull the wood veneer substrate into edge contact with a second wood veneer substrate. The tape is then rubbed onto the second wood veneer substrate. The process may be repeated as necessary to assemble the wood veneer substrates together in a desired pattern.

The taped wood veneer substrates are then positioned on an adhesive coated base substrate, e.g., core board or particle board. The adhesive present on the base substrate may be a glue or other adhesive composition. The adhesive composition may be applied to the base substrate by running the base substrate through a roll coater. Once the taped wood veneer substrates are positioned on the adhesive coated base substrate, the entire construction is subjected to a pressing process. The pressing process may include the application of pressure alone (a cold press) or pressure combined with heat (a hot press, e.g., 116° C. to 177° C. (241 and 351° F.) and 4.2 to 8.8 $kg/cm^2$ (60 to 125 psi)).

After pressing, the tape is removed from the wood veneer substrate. The tape may be removed either immediately after the veneered composite is removed from the press, or after the veneered composite has been allowed to cool. Sanding and, in particular cross-grain sanding, is unnecessary to remove the tape. Tape constructions having tear resistant backings are removed by grabbing the tab and peeling the tape off of the wood veneer substrate. This peeling can be performed manually or automatically, e.g., using a machine. In the case of tape constructions having heat shrinkable backings, the tape is sufficiently heated so as to shrink the backing and to cause the adhesive to pull off the wood veneer substrate.

The laminated construction may then undergo further processing before resulting in a finished product. In the case of wood veneer substrates, for example, the laminate ay be processed through one or more sanding steps to prepare the surface for staining and varnishing. The sanding smoothes the wood veneer surface, removing any unevenness or indentations created by the tape during pressing and any remaining adhesive residue.

EXAMPLES

Test Methods

Gel Content

The gel content of the adhesive composition was determined by weighing a 3.8 by 3.8 cm (1.5 by 1.5 in) tape sample (BA) and placing the sample in a pre-weighed stainless steel wire mesh basket (B) (64 mesh), inserting the basket and sample into a jar, and immersing the sample in toluene for 24 hours. The basket and sample were then removed from the solvent, placed on a pre-weighed pan (P) and dried at about 121° C. (250° F.) for about 30 minutes. Once dry, the weight of the backing (BS) was determined. The weight of the adhesive prior to soak in toluene (A') was determined by subtracting the weight of the backing after soak (BS) from the backing weight prior to soak (BA). The weight of the adhesive gel (G) was determined by the following formula:

$$G=PD-B-P-BS$$

where PD is the weight of the pan with the sample and basket after oven drying. The weight of the adhesive (A), adjusted to account for the percent soluble (PS) portion of the adhesive (previously determined from the adhesive formulation), was determined according to the following equation:

$$A=A'\times(1-PS)$$

The percent gel (%G) was then determined by the following equation:

$$\%G=(G/A)\times 100.$$

Initial Peel Adhesion Strength

Test specimens were prepared and evaluated at room temperature for initial peel adhesion strength using a 180° angle peel test as follows. A 40.6 cm (16 in) long, 2.5 cm (1 in) wide strip of pressure sensitive adhesive tape, prepared as described below, was placed on opposing major surfaces of a piece of oak or cherry wood veneer having a length of 20.3 cm (8 in), a width of 10.2 cm (4 in) and a nominal thickness of 0.8 mm (0.031), which had previously been wiped by hand to remove any loose dust. The tape strips were applied to the substrates by running a rubber coated, 2.0 Kg (4.5 lb) roller back and forth along the length of each strip twice. For each test specimen, the strips extended about 20.3 cm (8 in) beyond the edge of the wood veneer substrate to provide a tab for the peel adhesion strength test.

Peel adhesion strength was measured at an angle of 180° using a Model 4465 Instron Tensile Tester (Instron Corporation, Canton, Mass.) at a rate of 30.5 cm/minute (12 in/min.). The edge of the specimen having the tab end of the tape strip was placed in the bottom static clamp and the tab bent back and placed in the top dynamic clamp. A stainless steel plate, having the same length and width as the wood veneer substrate and a thickness of 1.19 mm (0.047 in), was positioned against the surface of the veneer substrate opposite the surface having the tape strip to be tested. The steel plate was held in place by the bottom clamp only of the tensile tester. The tape strip was pulled for a distance of about 5.1 cm (2 in). Peel adhesion strength was calculated as the average force measured during the test divided by the tape width. The values reported are an average of results obtained for two tape strips and are given in N/cm.

Removability

Several strips of heat shrinkable, pressure sensitive adhesive tape, prepared as described below, were placed on one surface of a 22.9 cm (9 in) square piece of oak or cherry wood veneer having a nominal thickness of 0.8 mm (0.031 in) which had been previously wiped by hand to remove any loose dust. The surface of the wood veneer was placed on a 1.3 cm (0.5 in) thick piece of plywood having the same length and width as the veneer, such that the tape surface was exposed. Several tape strips were applied at least 2.5 cm (1 in) from the edges of the veneer substrate. The tape strips were applied as single pieces, and as two or three centered, overlapping pieces at an angle of 90° or 60° respectively. Single strips measured about 5.1 by 2.5 cm (2 by 1 in); overlapping strips measured about 10.2 by 2.5 cm (4 by 1 in). The tape strips were pressed down, and any wrinkles removed, using hand pressure.

The test specimens were then exposed to either a cold press or hot press cycle to simulate lamination conditions used in the furniture industry. The cold press cycle conditions consisted of 2268 kilograms (5000 pounds force) force at room temperature for a period of 45 minutes. The hot press cycle conditions consisted of 2268 kilograms (5000 pounds force) force at about 127° C. (260° F.) for a period of 1 minute and 45 seconds. When a cold press cycle was employed, between 2 and 4 test specimens were placed in the press at a time. One test specimen was placed in the press during the hot press cycle.

After removal from the press, the test specimens were allowed to cool to room temperature, if necessary, and then were exposed to elevated temperatures using a heat gun (Model HG-501A, available from Master Appliance Corporation, Racine, Wis.). The heat gun was held between 2.5 and 5.1 cm (1 and 2 in) from the wood veneer surface and moved back and forth over the surface at a rate of about 2.5 cm/second (1 in/second) until the entire surface had been exposed to heat. The temperature at the wood veneer surface was between about 127° and 132° C. (260° and 270° F.) based on surface temperature indicators (Model TL-8-250 Temperature Indicating Devices, Paper Thermometer Company, Greenfield, N.H.).

When heated, a portion of the tape backing shrunk and pulled away from the wood veneer surface, generally removing adhesive with it. When a major portion of the backing pulled away and the amount of adhesive remaining on the exposed area, from which the backing had shrunk away, covered no greater than about 10% of the exposed area, the tape was considered removable.

Example 1

An 80:20/isooctyl acrylate (IOA): octyl acrylamide (OAA) composition was prepared by adding 1920.0 grams of IOA, 480.0 grams of OAA, 6.0 grams of Irgacure™ 651 (2,2-dimethoxy-2-phenylacetophenone available from Ciba-Geigy, Chicago, Ill.), and 7.2 grams of Ebecryl® P36 (an acrylated 30 derivative of benzophenone, available from UCB Radcure Inc., Smyrna, Ga.) to a 3.8 liter (1 gal) glass jar. The jar was then capped and put on a roller mill having two rubber rollers, one of which was motor driven at about 60 rpm, for about 2 hours to dissolve the Irgacure™ 651, Ebecryl® P36, and OAA in the IOA monomer. A clear homogenous solution was obtained.

About 800 grams of this monomer solution was poured into a 0.95 liter (one quart) glass jar fitted with a cap having an opening for a nitrogen gas source. The opening was slightly larger than the gas source to permit a steady flow of gas. The monomer solution was purged with dry nitrogen for about 60 minutes. While maintaining an inert atmosphere, the jar was then gently swirled and irradiated using two 15 Watt fluorescent lamps (Model F15T8-BLB, available from General Electric, Schenectady, N.Y.) positioned parallel to, and 2.54 cm (1 in) apart from, each other. The jar was held about 15.2 cm (6 in) from the lamps, and irradiated for about 30 seconds to provide a coatable syrup having a viscosity (Brookfield) of about 2500 to 3000 centipoise. The nitrogen source and cap were then removed and the jar left open to the air for about ten minutes. Another 2.4 gm of Ebecryl® P36 was added to the syrup and the jar capped and placed on a roller mill, as described above, for 24 hours to dissolve the P36 and provide a clear coatable syrup.

This syrup was coated onto biaxially oriented polypropylene film (BOPP) (available under the trade designation A/NS from AEP, Proponite Division, North Andover, Mass.) having a thickness of 30 mm (0.0012 in) which had been corona treated no more than 24 hours prior to coating. A 30.5 cm (12 in) wide knife-over-bed coating station was employed. The gap setting was 51 μm (0.002 in) greater than the BOPP film thickness, and the coating speed was 2.13 meters/min (7.0 ft/min). The coated film was passed through an irradiation chamber where it was exposed (from the adhesive side) to low intensity light at a wavelength of emission between 300 and 400 nm for a period of about 260 seconds to give a total calculated dose of about 1100 $mJ/cm^2$. The coated film was then exposed (from the adhesive side) to a medium pressure mercury lamp for 6 seconds to provide a total target dose of 400 $mJ/cm^2$. The dose values are reported in National Institute of Standards and Technology (NIST) units. The pressure sensitive adhesive tape obtained was applied to oak and cherry wood veneers and tested for initial adhesion and removability as described in the above test procedures. The results are shown in Tables 1 and 2 below.

Example 2

A 97:3/IOA:OAA composition was prepared and coated on a heat shrinkable backing to provide a pressure sensitive adhesive tape according to the method described in Example 1, with the exception that 2,328.0 grams of IOA and 72 grams of OAA were used. The tape was then evaluated for initial adhesion and removability. The results are shown in Tables 1 and 2 below.

Example 3

A 98:2/IOA:acrylic acid (AA) composition was prepared and coated on a heat shrinkable backing to provide a pressure sensitive adhesive tape according to the method described in Example 1, with the exception that 2,352.0 grams of IOA, 48.0 grams of AA were used. The tape was then evaluated for initial adhesion and removability. The results are shown in Tables 1 and 2 below.

TABLE 1

| | Initial Adhesion (N/cm) | |
|---|---|---|
| Example | Oak | Cherry |
| 1 | 1.61 | 2.32 |
| 2 | 1.85 | 2.72 |
| 3 | 1.14 | 1.42 |

The pressure sensitive adhesive tapes were capable of maintaining two or more pieces of wood veneer in fixed relation to each other.

TABLE 2

| | Removable? | | | |
|---|---|---|---|---|
| | Oak | | Cherry | |
| Example | Cold Press | Hot Press | Cold Press | Hot Press |
| 1 | Yes | Yes | Yes | Yes |
| 2 | Yes | Yes | Yes | No |
| 3 | Yes | Yes | Yes | No |

Other embodiments are within the claims. For example, although the substrate has been described as a wood veneer substrate, other substrates, including other porous substrates, can be used.

What is claimed is:

1. A method for preparing an article comprising:

(a) positioning a plurality of wood veneer substrates in relation to each other;

(b) applying a tape to the substrates to maintain the substrates in fixed relation to each other, the tape comprising a backing, and a rubber-based pressure sensitive adhesive composition disposed on the backing, wherein said adhesive includes 100 parts by weight elastomeric component and 5 to 20 parts by weight phenolic resin crosslinking agent, is essentially free of microspheres and chemical foaming agents, and has been sufficiently crosslinked so as to have a gel content of from about 50% to 100%;

(c) placing the substrates on an underlying base;

(d) laminating the substrates to the base by applying pressure to the tape to laminate the substrates to the underlying base; and (e) cleanly removing the tape such that no more than 10% of the adhesive remains on the substrates;

wherein the tape maintains the substrates in fixed relation to each other before and during the laminating.

2. The method of claim 1 wherein the step of cleanly removing the tape comprises peeling the tape from the substrates.

3. The method of claim 1 wherein the step of removing the tape comprises cleanly removing the tape from the substrates such that no adhesive remains on the substrates.

4. The method of claim 1 wherein the pressure sensitive adhesive composition of the tape has a viscosity such that the adhesive composition does not substantially flow into the pores of the wood veneer substrates before or during the laminating step (d).

5. The method of claim 4 wherein the backing of the tape is at least one of transparent; tear resistant; heat shrinkable; multiple layer; an oriented film comprising a polymer selected from the group consisting of polyethylene polymers, polypropylene polymers, polyester polymers, polyvinyl chloride polymers, and combinations of these materials and combinations of these materials with other materials.

6. The method of claim 4 wherein the tape further comprises a primer composition disposed between the backing and the adhesive composition.

7. The method of claim 4, wherein before the laminating step, the adhesive exhibits a peel adhesion strength of at least about 15 oz./in. measured on a steel substrate at room temperature pursuant to ASTM D3330, Test Method A.

8. The method of claim 1, wherein step (d) comprises applying pressure of from 60 to 125 psi.

9. The method of claim 8, wherein step (d) further comprises simultaneously applying heat of from 241° F. to 351° F.

10. A method for preparing an article comprising:

(a) positioning a plurality of wood veneer substrates in relation to each other;

(b) applying a tape to the substrates to maintain the substrates in fixed relation to each other, the tape comprising a backing, and a pressure sensitive adhesive composition disposed on the backing, wherein said adhesive comprises the reaction product of 75 to 90 parts by weight acrylic acid ester and 10 to 25 parts per weight polar monomer and is essentially free of microspheres, chemical foaming agents, and surfactants;

(c) placing the substrates on an underlying base;

(d) laminating the substrates to the base by applying pressure to the tape to laminate the substrates to the underlying base; and (e) cleanly removing the tape such that no more than 10% of the adhesive remains on the substrates;

wherein the tape maintains the substrates in fixed relation to each other before and during the laminating step.

11. The method of claim 10 wherein the pressure sensitive adhesive composition of the tape has a viscosity such that the adhesive composition does not substantially flow into the pores of the wood veneer substrates before or during the laminating step (d).

12. The method of claim 10 wherein the tape further comprises a primer composition disposed between the backing and the adhesive composition.

13. The method of claim 10, wherein step (d) comprises applying pressure of from 60 to 125 psi.

14. The method of claim 13, wherein step (d) further comprises simultaneously applying heat of from 241° F. to 351° F.

* * * * *

UNITED STATES PATENT AND TRADEMARK OFFICE

CERTIFICATE OF CORRECTION

PATENT NO. : 6,048,431
DATED : April 11, 2000
INVENTOR(S) : Clements et al.

It is certified that error appears in the above-identified patent and that said Letters Patent is hereby corrected as shown below:

Column 6,
Lines 21 and 28, "band" should read as -- based --.
Line 51, "ECR-1801™" should read as -- ECR-180™ --.

Column 7,
Line 39, delete "1.0".

Column 9,
Line 62, "ay" should read as -- may --.

Signed and Sealed this

Thirteenth Day of November, 2001

*Attest:*

Nicholas P. Godici

NICHOLAS P. GODICI

*Attesting Officer* *Acting Director of the United States Patent and Trademark Office*